(12) United States Patent
Swanborn

(10) Patent No.: US 9,687,759 B2
(45) Date of Patent: Jun. 27, 2017

(54) APPARATUS FOR CYCLONE SEPARATION OF A FLUID FLOW INTO A GAS PHASE AND A LIQUID PHASE AND VESSEL PROVIDED WITH SUCH AN APPARATUS

(71) Applicant: Sulzer Chemtech AG, Winterthur (CH)

(72) Inventor: Rombout Adriaan Swanborn, Oosterbeek (NL)

(73) Assignee: Sulzer Chemtech AG, Winterthur (CH)

( * ) Notice: Subject to any disclaimer, the term of this patent is extended or adjusted under 35 U.S.C. 154(b) by 151 days.

(21) Appl. No.: 14/419,571

(22) PCT Filed: Aug. 7, 2013

(86) PCT No.: PCT/NL2013/050584
§ 371 (c)(1),
(2) Date: Feb. 4, 2015

(87) PCT Pub. No.: WO2014/025256
PCT Pub. Date: Feb. 13, 2014

(65) Prior Publication Data
US 2015/0217211 A1    Aug. 6, 2015

(30) Foreign Application Priority Data
Aug. 8, 2012    (NL) ...................................... 2009299

(51) Int. Cl.
*B01D 19/00* (2006.01)
*B04C 5/13* (2006.01)
*B04C 3/04* (2006.01)

(52) U.S. Cl.
CPC ............ *B01D 19/0057* (2013.01); *B04C 3/04* (2013.01); *B04C 5/13* (2013.01)

(58) Field of Classification Search
CPC ...... B01D 19/00; B01D 19/0057; B04C 3/04; B04C 5/13; B04C 3/06; B04C 5/107; B04C 5/181
(Continued)

(56) References Cited

U.S. PATENT DOCUMENTS

| 6,752,860 B1 * | 6/2004 | Hoydal | B01D 17/0208 166/105.5 |
| 2008/0006011 A1 * | 1/2008 | Larnholm | B01D 17/0217 55/421 |

(Continued)

FOREIGN PATENT DOCUMENTS

| CN | 201002059 Y | 1/2008 |
| DE | 3826454 A1 | 2/1990 |

(Continued)

*Primary Examiner* — T. Bennett McKenzie
(74) *Attorney, Agent, or Firm* — Larson & Anderson, LLC

(57) ABSTRACT

The invention relates to an apparatus for cyclone separation of a fluid flow into essentially a gas phase fraction and a liquid phase fraction, by bringing the fluid flow into rotation so that said fluid flow is separated into a central zone essentially containing the gas phase fraction, and an outer annular zone essentially containing the liquid phase fraction, comprising: a housing (2); a swirl element (6) for rotation of the fluid; a gas phase outlet (5); and a liquid phase outlet (4); whereby the gas phase outlet and the liquid phase outlet both connect to a common collecting chamber outside the housing. The invention also relates to a vessel provided with at least one such apparatus.

13 Claims, 4 Drawing Sheets

(58) Field of Classification Search
USPC .......................................................... 96/216
See application file for complete search history.

(56) References Cited

U.S. PATENT DOCUMENTS

2009/0084714 A1  4/2009  Schook
2012/0227585 A1  9/2012  Akdim et al.

FOREIGN PATENT DOCUMENTS

| EP | 1180400 A1 | 2/2002 | |
|----|----|----|----|
| NL | WO 2012019624 A1 * | 2/2012 | ............. B01D 45/16 |
| RU | 2056135 C1 | 3/1996 | |
| WO | 9503868 A1 | 2/1995 | |
| WO | 2011048439 A1 | 4/2011 | |

* cited by examiner

APPARATUS FOR CYCLONE SEPARATION OF A FLUID FLOW INTO A GAS PHASE AND A LIQUID PHASE AND VESSEL PROVIDED WITH SUCH AN APPARATUS

CROSS-REFERENCE TO RELATED APPLICATIONS

This application is the United States national phase of International Application No. PCT/NL2013/050584 filed Aug. 7, 2013, and claims priority to The Netherlands Patent Application No. 2009299 filed Aug. 8, 2012, the disclosures of which are hereby incorporated in their entirety by reference.

BACKGROUND OF THE INVENTION

Field of the Invention

The invention relates to an apparatus for cyclone separation of a fluid flow into essentially a gas phase fraction and a liquid phase fraction, by bringing the fluid flow into rotation so that the fluid flow is separated into a central zone essentially containing the gas phase fraction, and an outer annular zone essentially containing the liquid phase fraction, comprising: a housing having an upstream fluid inlet; a swirl element for rotation of the fluid flow being located in the housing downstream of the fluid inlet; a gas phase outlet opened to the central zone of the housing downstream of the swirl element; and a liquid phase outlet connecting to the outer zone of the housing downstream of the swirl element, whereby the gas phase outlet and the liquid phase outlet both connect to a common collecting chamber outside the housing. The invention also relates to a vessel provided with at least one apparatus.

Description of Related Art

Cyclone separators are known in the technology field of extraction of hydrocarbons (oil and gas). The produced fluids usually consists of liquid (oil and water) in which gas is dissolved whereby during transportation gas bubble formation and two-phase flow arises leading to undesired pulsatory flow and vibrations in pipelines. A fluid is thus defined as containing a liquid and/or a gas; a liquid may solely consist of a fluid or solely consist of a gas, or as a third alternative may consist of a mixture of a liquid and a gas. To solve these problems in extracting of hydrocarbons cyclone separation of a fluid flowing through a pipeline is realised by in line apparatuses bringing the fluid in rotation so that the fluid is separated into a central zone containing a light fraction, essentially a gas phase fraction, and an outer annular zone containing a heavier fraction, essentially a liquid phase fraction. The gas phase fraction in the central zone and the liquid phase fraction in the outer zone are discharged via respective liquid phase outlet means and gas phase outlet means. The liquid phase outlet means and gas phase outlet means both end up in a common chamber (vessel) wherein the both fractions are thus introduced in pre-separated condition thus resulting in a better and faster separation of the fractions then when introduced in such a vessel without per-separation in one or more apparatuses for cyclone separation.

A general object of the invention is to provide an apparatus and a method able to effectively separate a fluid flow by rotation (centrifugal separation) in essentially a light gas fraction and a heavier liquid fraction with higher efficiency than the prior art cyclone separation technique.

SUMMARY OF THE INVENTION

The present invention provides an apparatus for cyclone separation characterised in that such apparatus also comprises at last one permeable flow guide located centrally in a housing, which permeable flow guide connects to a gas phase outlet. The permeable flow guide is to be understood as at least permeable for the light gas fraction, however the flow guide may alternatively also be permeable for both the fractions; the light gas fraction as well as the heavier liquid phase fraction. Such a separating cyclone has improved properties compared to the prior art separating cyclones. This is understood to mean that the cyclone according the present invention realises a higher separating efficiency at a given composition and pressure of the fluid for admitting and/or a lower pressure drop over the cyclone. This is a result of the fact that the rotation of the fluid is longer maintained after passing a swirl element in the situation that a flow guide is installed than in the conventional situation wherein the flow guides is missing (conventional separators and gas scrubbers). A further advantage is that the flow guide limits the change of re-entering of liquid phase parts (droplets) in the gas flow near the entrance of the gas phase outlet as the flow guide results in a more gradual turn of the gas flow thus limiting the turbulence in the area downstream the swirl element. Another positive effect from the presence of the permeable flow guide is that it leads to a lower pressure drop over the separator. All these advantages lead to a higher primary separation efficiency. The apparatus according the invention may also simply be installed in any existing equipment without the need for any substantial modifications on other construction elements.

A relevant application of the apparatus according to the invention will be to separate hydrocarbon gas from produced water on an oil production platform, so that a serious two phase flow (slugging) in the produced water-pipeline is eliminated. The apparatus enables the gas to be separated from the water in a simple and compact manner in addition, the separated gas may be recovered instead of being burnt off in the flare of the platform.

The gas phase outlet preferably comprises a gas discharge channel extending through the swirl element, whereby the inlet opening of the gas discharge channel is positioned at the distal end of the swirl element. Thereby the opening of the gas phase outlet may be positioned at the distal end of the swirl element (or on a short distance before or after the swirl element) and the flow guide connects to the swirl element. For enabling such feed of the gas discharge channel the swirl element preferably comprises swirl blades connected to a core body. Through this core body of the swirl element the gas phase outlet may be fed such that the upstream end of the gas phase outlet ends at the downstream side of the core body of the swirl element. The gas phase outlet further then further extends through the core body thus feeding the gas backwards in relation to the flow of the fluid feed. Preferably the outlet for the liquid fraction is connecting in axial direction to the housing.

In a specific embodiment the flow guide is substantially cone shaped, the cone shaped flow guide connects to the opening of the gas phase outlet, and the tip of the cone shaped flow guide is directed downstream. A variation on the cone shaped flow guide is that the cone shaped flow guide is undercut, bullet shaped or is provided with helical grooves or any other profile.

As the flow guide is permeable it may be partially opened. Such is possible if the flow guide is provided with apertures, such as holes (e.g. circular holes), slots, grooves on any other type. Another option is to construct a partially opened flow guide out of mesh material. A further alternative for a permeable flow guide is a guide that is exclusive permeable for a gas fraction or a flow guide that is hardly permeable for liquids. Options for such flow guides that are not or limited permeable for liquid are e.g. flow guides made out of ceramics or consists of a membrane material.

The separating cyclone may relates to a tangential, radial or axial separating cyclone. In a tangential separating cyclone the fluid inlet debouches tangentially relative in the housing. However the fluid inlet may also debouche radial or axial in the housing as a swirl element is provided creating the rotation of the fluid.

The housing is essentially tubular, however to enhance the efficiency by bringing about a further increase in the tangential speed of the fluid, the housing has in a further preferred embodiment a decreasing diameter at the position of the distal part of the housing.

The liquid phase outlet preferably comprise a liquid discharge pipe extending coaxially with the housing, so that the relative heavy liquid is discharged with a minimum pressure drop.

In yet an other alternative embodiment the permeable flow guide located centrally in the housing connecting to the gas phase outlet comprises a secondary gas extraction device that is coaxially located in the liquid phase outlet on a distance of the opening of the gas phase outlet, and which secondary gas extraction device connects to the gas phase outlet with a coaxial gas retrieval pipe, the surface of he cross-section of the gas retrieval pipe being smaller than the surface of the cross-section of the secondary gas extraction device. In case both the gas retrieval pipe and the secondary gas extraction device are in axial direction rotational symmetrical than the diameter of the gas retrieval pipe is smaller than the (average) diameter of the secondary gas extraction device. Apart from the advantages already listed before this embodiment enables the separation of entrained gas from the liquid phase fraction; thus further enhancing the separation efficiency of the apparatus for cyclone separation. The primary separation has already taken place before close to the swirl element where a first gas volume is removed via the opening of the gas phase outlet; now the secondary gas extraction device enables to remove a second gas phase fraction that was still not removed from the liquid during the first separation step.

Preferably such secondary gas extraction device has a decreasing diameter downstream from the connection to the gas retrieval pipe. This implies that the distal part of the secondary gas extraction has a smaller diameter than its diameter further upstream. Due to the constriction of the secondary gas extraction device the speed of the liquid phase fraction flow will decrease and the pressure of the liquid will as a result rise. The higher liquid pressure downstream the secondary gas extraction device will further support the drainage of any gas remains in the liquid phase fraction flow; which further diminishes the gas content of the liquid that leaves the apparatus for cyclone separation. For the drainage of remaining gas the secondary gas extraction device is preferably provided with apertures (or is at least permeable as already discloses in relation to the cone that directly connects to the gas discharge) to let a remaining light gas fraction in the already pre-separated liquid in the liquid phase outlet enter the secondary gas extraction device. From there the gas is lead through the coaxial gas retrieval pipe to the gas phase outlet. To prevent the gas leaving the secondary gas extraction device uncontrolled the secondary gas extraction device can be closed at its distal end. An further additional feature to the secondary gas extraction device can be at least one helical blade to be located on the perimeter (outside) thus influencing the liquid phase flow in the liquid phase outlet and enabling a better control of the liquid pressure.

The invention also provides an apparatus for cyclone separation wherein the permeable flow guide comprises: a cone shaped permeable flow guide that connects to the opening of he gas phase outlet, and a secondary gas extraction device that is coaxially located in the liquid phase outlet on a distance of the opening of the gas phase outlet, whereby the coaxial gas retrieval pipe of the secondary gas extraction device connects to the distal side of the cone shaped permeable flow guide. In this embodiment the combination of two different embodiments of the apparatus for cyclone separation as previously are combined.

The invention also relates to a vessel provided with at least one apparatus for cyclone separation according the present invention, wherein the gas phase outlet and the liquid phase outlet of the apparatus for cyclone separation both end in a single communicating space. In a preferred embodiment more than one apparatus for cyclone separation are located in a single vessel and the fluid inlets of these plural apparatuses for cyclone separation are preferably connected to a common distribution chamber, which distribution chamber connects to a central external fluid feed for the fluid to be processed.

Seabed installations in flow lines and transport pipes will also be a possibility for this technology, thus to separate an (oil) well flow directly in the flow line from the oil well, either on a platform, under water or down in the oil well. The substantial axial feed flow in the housing enables reduced constructional dimensions and limits the pressure drop in the apparatuses for cyclone separation according the present invention. The application of the invention in the technology field of extraction of hydrocarbons makes it possible to relieve the gas separation process on the platform. Oil well production is often limited because of the gas capacity of conventional separators. By separating the gas from the oil well flow upstream of the conventional separator train, the resulting gas quantity to be processed will decrease, and the bottleneck is taken away. The gas may be conducted outside of the separator train directly and/or reinjected in the well.

BRIEF DESCRIPTION OF THE DRAWINGS

The invention is further elucidated on the basis of the non-limitative exemplary embodiments shown in the following figures. Herein.

DETAILED DESCRIPTION OF THE INVENTION

Figure 1:
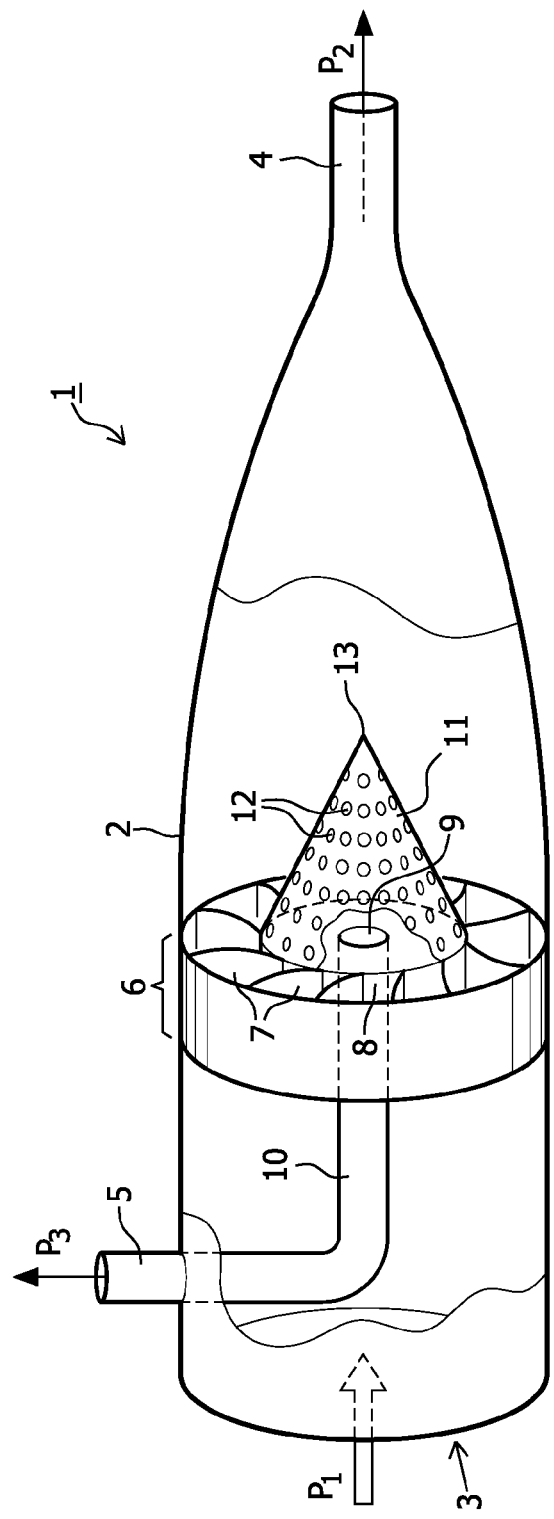
FIG. 1 shows a perspective side view of an embodiment of an apparatus for cyclone separation according the present invention including a cone shaped flow guide that directly connects to the gas phase outlet.

The apparatus 1 according to the invention as shown in FIG. 1 is intended for separation of a gas phase fraction from a liquid phase fraction (e.g. water/oil), for example from a fluid in a pipeline leading to an oil platform that is fed to the apparatus 1 according arrow $P_1$. The apparatus 1 comprises a housing 2 having an inlet 3 for the supply of the fluid to be degassed, a liquid phase fraction outlet 4 where the heavier liquid phase leaves the housing 2 according arrow $P_2$, and a gas phase fraction outlet 5 where the lighter gas phase fraction leaves the housing 2 according arrow $P_3$. The supply of the fluid to be degassed according arrow $P_1$ and the discharge of the heavier liquid phase fraction according arrow $P_2$ in both cases takes place in the axial direction of the housing 2. The housing 2 here shown is conical (decreasing in axial direction to the distal end of the housing 2) but could also have another shape, for example cylindrical shape with a fixed diameter. In the housing 2 is mounted an co-axial swirl element 6 comprising curved swirl blades 7 connected to a core body 8. The swirl element 6 sets the fluid to be degassed into rotation for achieving the desired separation of the two-phase mixture downstream of the swirl element 6 into a gas phase fraction in a central zone of the housing 2, and liquid phase fraction in an annular outer zone of the housing 2. The separation of the two fractions is to be understood as a separation in essence; the gas phase fraction will likely still contain vapours and liquid fractions (droplets).

The separation is a result of the tangential speed of the fluid to be degassed, the relatively heavier liquid phase fraction of the fluid will fling outward due to centrifugal forces while the light gas phase fraction of fluid will migrate to the core of the housing 2. The heavier liquid phase fraction is then discharged according arrow $P_2$ via liquid phase fraction outlet 4, while the gas phase fraction is fed backwards through an inlet opening 9 of a gas discharge channel 10. The inlet opening 9 is located in the core body 8 of the swirl element 6. The gas phase fraction finally leaves the apparatus 2 according arrow $P_3$.

Centrally in the housing 2 is also provided a permeable flow guide 11 provided with holes 12. The permeable flow guide 11 connects to the inlet opening 9 of the discharge channel 10 and is as shown positioned at the distal end of the swirl element 6 such that it directly connects to (is linked to) the swirl element 6. The flow guide 11 shown here is cone shaped, the tip 13 of the cone 11 directed downstream. The flow guide 11 makes that the rotation of the fluid provided by the swirl element 6 longer continues. The flow guide 11 also limits the turbulence downstream of the inlet opening 9 thus limiting the remixing of already the separated liquid and gas phase fractions. The flow guide 11 provides a gradual turn of the separated gas fraction flow.

Figure 2:
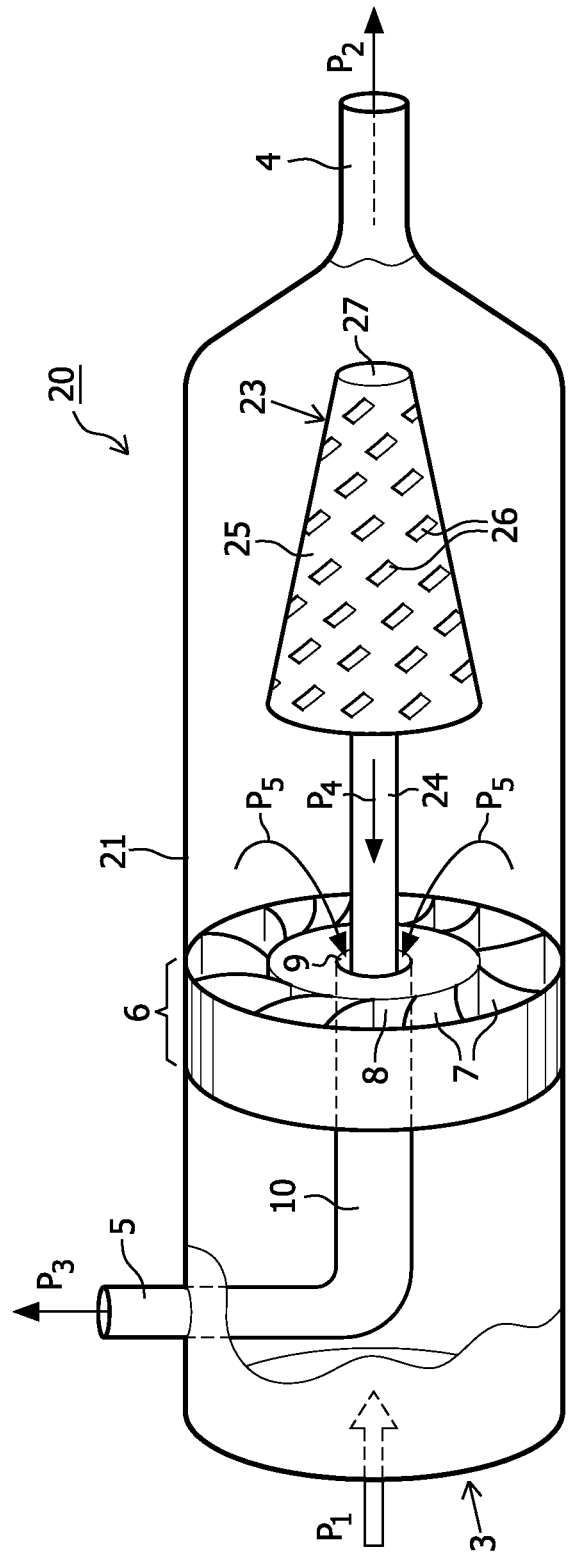
FIG. 2 shows a perspective side view of an alternative embodiment of an apparatus for cyclone separation according the present invention including a flow guide comprising a secondary gas extraction device on a distance of the gas phase outlet.

FIG. 2 shows an alternative embodiment of an apparatus 20 for cyclone separation according the present invention. Corresponding components with the embodiment shown in FIG. 1 are designated with the same reference numerals. Housing 21 of the apparatus 20 as shown has a more cylindrical shape that the housing 2 shown in FIG. 1. A further, and more relevant difference in relation to the present invention is that the apparatus 20 comprises a flow guide 22 with a secondary gas extraction device 23 on a distance of the inlet opening 9 of the gas discharge channel 10. The secondary gas extraction device 23 connects to the inlet opening 9 of the discharge channel 10 with a coaxial gas retrieval pipe 24 feeding the separated gas fraction back (according arrow P4) to the inlet opening 9 of the discharge channel 10 and then further back through the discharge channel (according arrow P3). The gas retrieval pipe 24 connects to the inlet opening 9 of the discharge channel 10 such that there is still an opening left between them to allow the first gas fraction separated from the fluid shortly after the swirl element 6 to flow into the gas discharge channel 10 according arrow P5. This can realised e.g. by using a gas retrieval pipe 24 that has a smaller diameter than the diameter of the opening 9 of the gas discharge channel 10. This may even result in a lower pressure in the gas retrieval pipe 24 due to a venturi effect. The gas retrieval pipe 24 also has a smaller diameter than the diameter of the secondary gas extraction device 23. The secondary gas extraction device 23 has a truncate cone shaped body 25 provided with apertures 26 to enable the gas phase fraction to enter the truncate cone shaped body 25. The truncate cone shaped body 25 is closed at it distal end 27. Also the embodiment as shown in FIG. 2 leads to a higher separating efficiency.

Not shown in the FIGS. 1 and 2 is a guide body that my be provided in the housing 2, 21 upstream of the swirl element 6 to guide the supplied fluid in an annular axial flow to the swirl element 6. Another remark is that all dimensions and configurations of the apparatus 1, 20 have to be adapted to the typical application conditions. An example of such geometry a the apertures 12, 26; these may vary or even lack as long as the flow guide 11 and the truncate cone shaped body 25 are permeable for the separated gas phase fraction.

Figure 3:
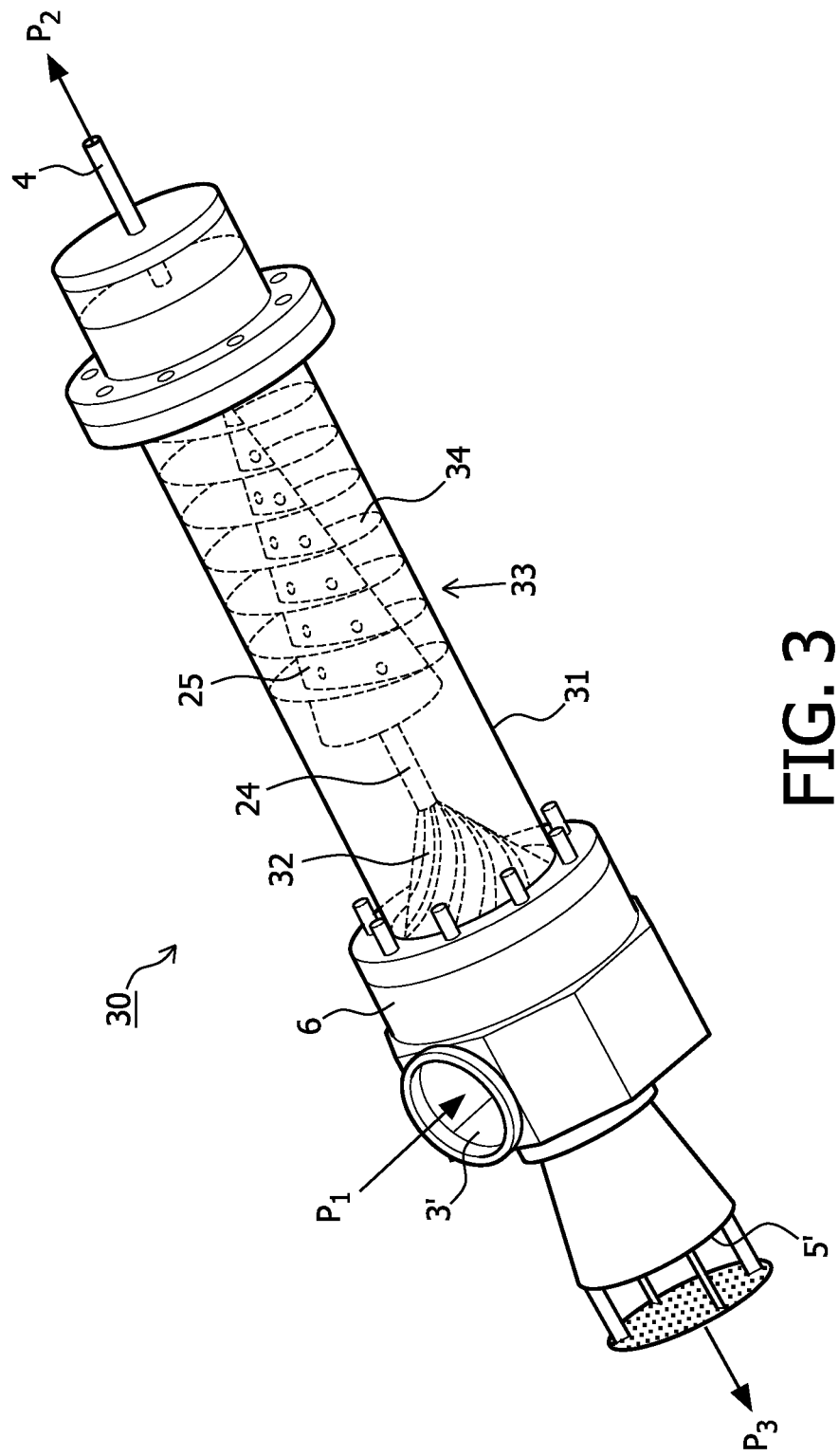
FIG. 3 shows a perspective side view of a second alternative embodiment of an apparatus for cyclone separation according the present invention combining the two embodiments as presented in FIGS. 1 and 2.

FIG. 3 shows a second alternative embodiment of an apparatus 30 for cyclone separation according the present invention combining some features of the two apparatuses 1, 20 shown in FIGS. 1 and 2. Again corresponding components with the embodiments shown before are designated with the same reference numerals. The apparatus for cyclone separation 30 is provided with a substantially cylindrical housing 31 having an inlet 3' for the fluid to be degassed, a liquid phase fraction outlet 4, and a gas phase fraction outlet 5'. The inlet 3' and the gas phase outlet 5' are changed of position in relation to the comparable items in the FIGS. 1 and 2. Here the fluid fed via inlet 3' is making a turn before entering the swirl element 6 while the separated gas phase fraction coaxially leaves the gas phase outlet 5'. The apparatus 30 furthermore also comprises a permeable flow guide 32 directly connecting to the inlet opening 9 of the discharge channel 10 (not disclosed in this figure). The flow guide 32 is composed out of helical strips and is on its distal tip side it is connected to a retrieval pipe 24 further downstream leading to a secondary gas extraction device 33 having cone shaped body 25 with apertures. The outside of the secondary gas extraction device 33 is provided with a helical guiding blade 34 for guiding the liquid along the cone shaped body 25.

Figure 4:
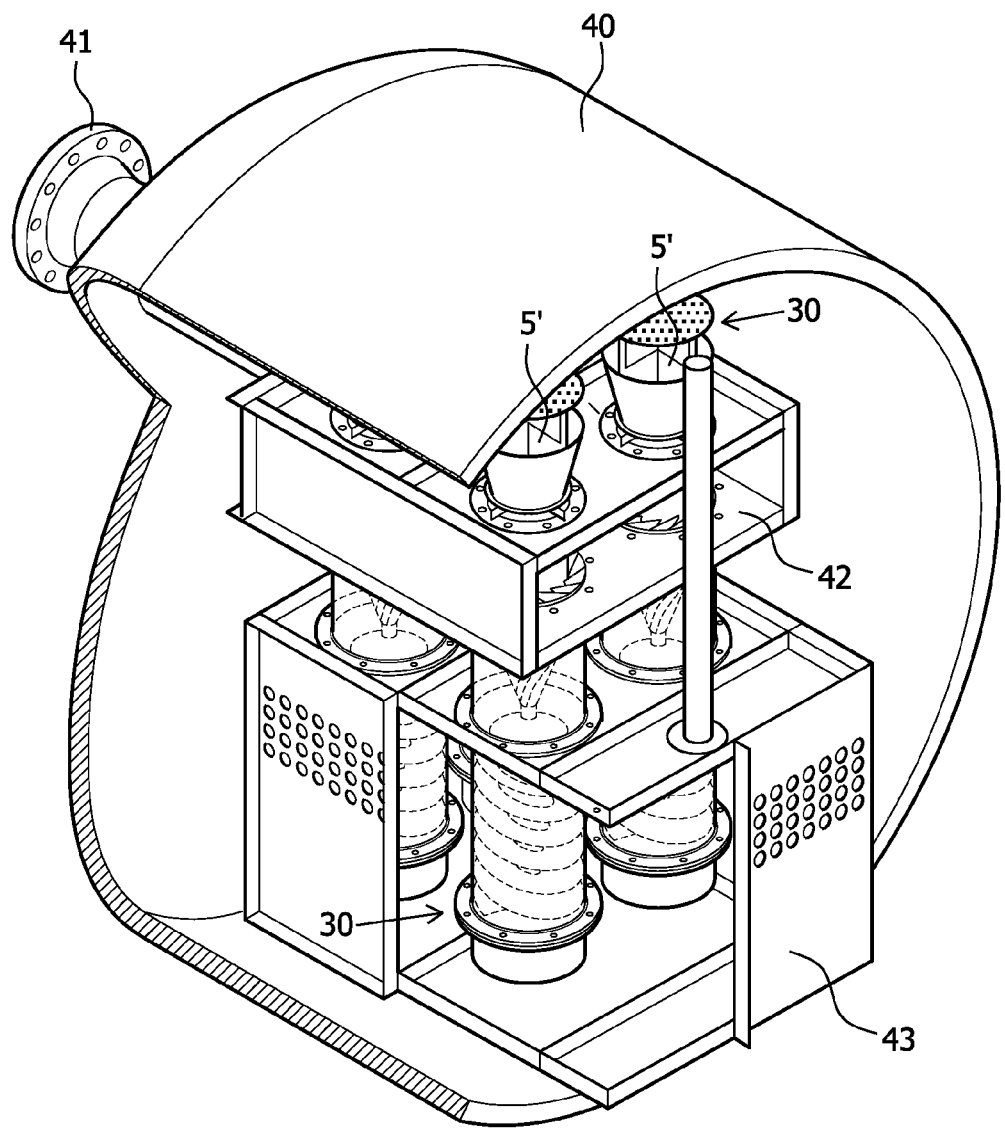
FIG. 4 a vessel provided with at four apparatuses for cyclone separation as shown In FIG. 3.

FIG. 4 a partially cut-away vessel 40 holding four vertically oriented apparatuses 30 for cyclone separation as shown in FIG. 3. Via a feed pipe 41 on the side of the vessel the fluid to be separated is entering the vessel 40 to enter a distribution chamber 42. From the distribution chamber 42 the fluid to be separated enters the four apparatuses 30 for cyclone separation. On the underside (there where the liquid phase fraction outlets 4 are located) of the apparatuses 30 for cyclone separation the housings 31 are surrounded by a partially opened casing 43 for reducing flow speeds and turbulence of the liquid leaving the apparatuses 30 for cyclone separation. The gas phase fraction leaves the vertically oriented apparatuses 30 for cyclone separation via gas phase outlet 5'. The fluid entering the vessel 40 via feed pipe 41 is thus after passing the four vertically oriented apparatuses 30 for cyclone separation fast, simple and effectively divided in a gas phase fraction in the top of the vessel 40 and a liquid phase fraction at the bottom of the vessel 40.

It has been found that the apparatus 30 and the vessel 40 as shown in FIGS. 3 and 4 are particularly suitable for enabling a high separating efficiency in the technology field of extraction of hydrocarbons.

The invention claimed is:

1. An apparatus for cyclone separation of a fluid flow into essentially a gas phase fraction and a liquid phase fraction, by bringing the fluid flow into rotation so that said fluid flow is separated into a central zone essentially containing the gas phase fraction, and an outer annular zone essentially containing the liquid phase fraction, comprising:
   a housing having an upstream fluid inlet;
   a swirl element for rotation of the fluid flow being located in the housing downstream of the fluid inlet;
   a gas phase outlet opened to the central zone of the housing downstream of the swirl element; and
   a liquid phase outlet connecting to the outer zone of the housing downstream of the swirl element;
   whereby the gas phase outlet and the liquid phase outlet both connect to a common collecting chamber outside the housing,
   wherein the apparatus further comprises at least one permeable flow guide located centrally in the housing, which permeable flow guide connects to the gas phase outlet,
   wherein the gas phase outlet comprises a gas discharge channel extending through the swirl element,
   wherein the opening of the gas phase outlet is positioned at the distal end of the swirl element and the flow guide connects to the swirl element,
   wherein the swirl element comprises swirl blades connected to a core body, and
   wherein the gas phase outlet extends through the core body of the swirl element such that an upstream inlet opening of the gas phase outlet extends at a downstream side of the core body of the swirl element for feeding the gas phase fraction backwards in relation to the fluid flow.

2. The apparatus according to claim 1, wherein the flow guide is substantially cone shaped, the cone shaped flow guide connects to the opening of the gas phase outlet, and the tip of the cone shaped flow guide is directed downstream.

3. The apparatus according to claim 2, wherein the cone shaped flow guide is undercut.

4. The apparatus according to claim 1, wherein the flow guide is provided with apertures.

5. The apparatus according to claim 1, wherein the housing is essentially tubular.

6. The apparatus according to claim 1, wherein the permeable flow guide located centrally in the housing connecting to the gas phase outlet comprises a secondary gas extraction device that is coaxially located in the liquid phase outlet on a distance of the opening of the gas phase outlet and which secondary gas extraction device connects to the gas phase outlet with a coaxial gas retrieval pipe, the surface of the cross-section of the gas retrieval pipe being smaller than the surface of the cross-section of the secondary gas extraction device.

7. The apparatus according to claim 6, wherein the secondary gas extraction device has a decreasing diameter downstream from the gas retrieval pipe.

8. The apparatus according to claim 6, wherein the secondary gas extraction device is provided with apertures to let a remaining gas fraction in the already pre-separated liquid in the liquid phase outlet enter the secondary gas extraction device.

9. The apparatus according to claim 6, wherein the secondary gas extraction device is closed at its distal end.

10. The apparatus according to claim 6, wherein the secondary gas extraction device is on the perimeter provided with at least one helical blade that is located in the liquid phase outlet.

11. The apparatus according to claim 1, wherein the permeable flow guide comprises:
    a cone shaped permeable flow guide connecting to the opening of the gas phase outlet, and
    a secondary gas extraction device that is coaxially located in the liquid phase outlet on a distance of the opening of the gas phase outlet,
    whereby a coaxial gas retrieval pipe of the secondary gas extraction device connects to the distal side of the cone shaped permeable flow guide.

12. A vessel provided with at least one apparatus for cyclone separation according to claim 1, wherein the gas phase outlet and the liquid phase outlet of the apparatus for cyclone separation both end in a single communicating space.

13. The vessel according claim 12, wherein the vessel comprises plural apparatuses for cyclone separation of which all fluid inlets are connected to a common distribution chamber, which distribution chamber connects to a central fluid feed.

* * * * *